Sept. 4, 1923.  R. DENAULT  1,466,995

ANTISKID DEVICE FOR VEHICLE WHEELS

Filed Nov. 2, 1920

Inventor
Rudolph Denault
By his Attorney
W. T. Criswell

Patented Sept. 4, 1923.

1,466,995

UNITED STATES PATENT OFFICE.

RUDOLPH DENAULT, OF BROOKLYN, NEW YORK.

ANTISKID DEVICE FOR VEHICLE WHEELS.

Application filed November 2, 1920. Serial No. 421,252.

*To all whom it may concern:*

Be it known that I, RUDOLPH DENAULT, a subject of the King of England, and a resident of New York, borough of Brooklyn, in the county of Kings and State of New York, have invented certain new and useful Improvements in an Antiskid Device for Vehicle Wheels, of which the following is a full, clear, and exact specification.

This invention relates to a class of devices adapted to be used in conjunction with vehicles.

My invention has for its object primarily to provide an anti-skid device designed to be employed for preventing the wheels of vehicles, especially the wheels of automobiles, auto-trucks and motorcycles, from tending to slip on highways when travelling so that the danger of the occurrence of accident from this cause may be overcome, it being well known that the wheels of such vehicles tend to readily skid particularly when the highway is slippery owing to the wheels having rubber tires. The invention consists essentially of a band composed of pivotally connected sections or curved plates so that the band may be removably applied to the outer periphery lengthwise of the tire of a vehicle wheel. Protruding in opposite lateral directions from each plate of the band is a pair of straps, each consisting of a curved rigid member and a flexible member for being disposed over the tire and over the inner periphery of the wheel respectively, and the free ends of the flexible members of each pair of the straps are detachably fastened together by a catch or buckle whereby the band will be held on the tire against accidental movement and removal. On the tread surface of each plate of the band are spaced substantially rectangular gripper elements or lugs which extend crosswise of the plate so that the ends of the lugs will engage the surface of the highway to prevent tendency of the wheel to skid.

A further object of the invention is to provide an anti-skid device of a simple and efficient construction which may be made of any suitable material in various sizes.

With these and other objects in view, the invention will be hereinafter more fully described with reference to the accompanying drawing forming a part of this specification in which similar characters of reference indicate corresponding parts in all the views, and will then be pointed out in the claims at the end of the description.

Figure 1:
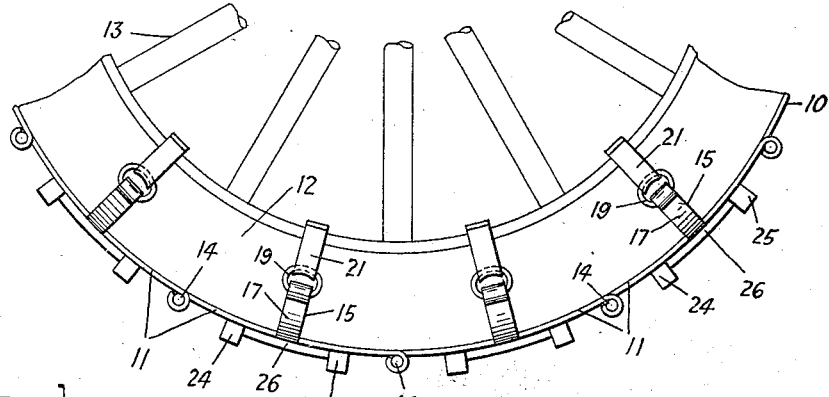
Figure 2:
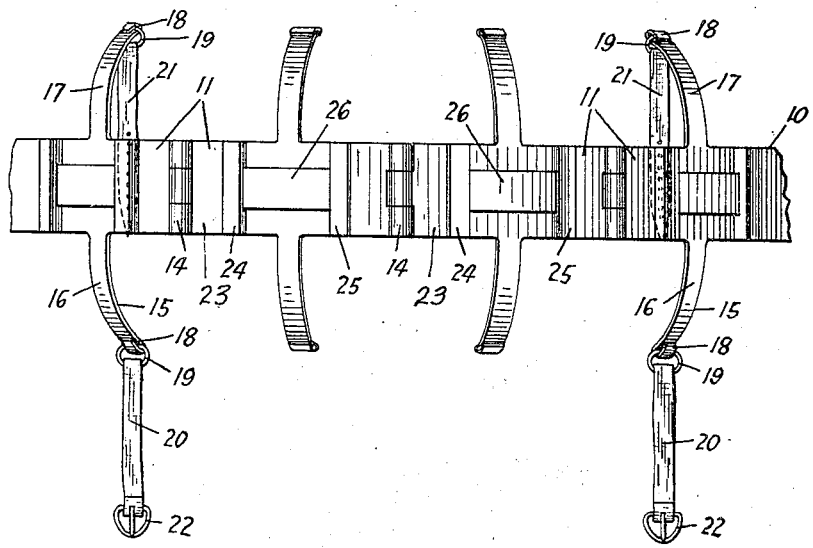

In the drawing, Figure 1 is a fragmentary view showing part of a vehicle wheel with part of my improved anti-skid device applied thereto, and Fig. 2 is an enlarged fragmentary view showing a plan of a portion of the device.

The device has an endless band 10 composed of corresponding plates 11 each of which is preferably substantially rectangular, and these plates are similarly curved or concaved lengthwise as well as being of sufficient number so that by arranging them endwise in a row the band will be of the required diameter to removably fit closely on the outer periphery of the tire, as 12, of the wheel 13 of an automobile, autotruck, motorcycle or other vehicle. These plates are of widths so that they will cover the greater portion of the tread surface of the tire, and the adjacent ends of the plates are hinged together, as at 14, to allow the plates to move with the resilient movement of the tire.

In order to detachably fasten the band 10 to the wheel of the vehicle against accidental displacement on the tire, on each of the plates 11 is provided a strap element, as 15. All of these strap elements are preferably of similar formations, and each strap element is composed of two rigid arm members 16 and 17 which protrude laterally in opposite directions from the side edges of the plates. The arm members of each pair are curved upwardly in spaced relation from the concavity of the plate so that when the band 10 is arranged on the tire of the wheel with the tread of the tire being seated in the concavities of the plates of the band the rigid arm members of the strap elements will be disposed transversely of the tire as well as conforming with the curvatures of the sides of the tire. The curved rigid arm members of the plates are of lengths so that their free ends terminate preferably approximately midway of the sides of the tire, and on the free end of each arm member may be an eye or opening 18 in which is mounted a ring, as 19. To the rings 19 of each pair of the rigid arm members 16 and 17 are held one of the ends of a pair of flexible members, as 20 and 21. The arm members 16 and 17 of each of the strap elements 15 are preferably made of metal, while the flexible members 20 and 21 are preferably made of leather. The flexible members of each pair of the strap elements are of lengths so that their free ends will meet or overlap on the inner periphery of the rim of the wheel when disposed from the arm members over the tire and rim of the vehicle wheel, and the free end parts of the flexible members of each strap element may be detachably fastened together by any suitable form of catch or buckle, as 22, in order to removably hold the band on the tire.

On the outer or concaved or tread face 23 of each of the curved plates 11 of the band 10 is a pair of spaced gripper elements or lugs 24 and 25 extending across the plate, and both lugs of each pair are substantially rectangular as well as being of thicknesses so that they protrude some distances from the plate. The lugs of each pair are also of lengths so that their ends terminate at the side edges of the plate to position their ends whereby they will engage the surface of the highway in event of tendency of the wheels to skid when the vehicle is travelling; and on each plate of the band 10 between each pair of the lugs 24 and 25 may be a plate, as 26, of less thickness than the lugs in order to reinforce the lugs from tending to accidentally shift on the plates. Thus a simple, efficient and durable anti-skid device is provided for serving to prevent accidents from occurring to vehicles by avoiding tendency of the wheels to skid on slippery highways.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In a sectional anti-skid device, a substantially rectangular curved plate, a pair of spaced substantially rectangular lugs integral with the tread surface thereof, both of the lugs extending cross-wise of the plate so that the ends of the lugs will engage the surface of the highway to prevent the wheel from skidding and a plate of less thickness located substantially equidistant from the sides of the plate and connecting the aforementioned lugs.

2. In a sectional anti-skid device, a substantially rectangular curved plate, a pair of spaced substantially rectangular lugs on the tread surface of said plate and both of the lugs extending crosswise of the plate so that the ends of the lugs will engage the surface of the highway to prevent the wheel from tending to skid, and an approximately rectangular plate between the lugs, said plate being of less thickness than the lugs.

3. An anti-skid device including a plurality of curved plates, lugs extending transversely of each plate and located equidistant from the ends of the plate and a plate of less thickness extending longitudinally of each plate and connecting the aforementioned lugs.

This specification signed and witnessed this 1st day of November A. D. 1920.

RUDOLPH DENAULT.

Witnesses:
A. A. BAUER,
J. FREDERICK CRYER.